United States Patent [19]

Hebert

[11] Patent Number: 4,501,660
[45] Date of Patent: Feb. 26, 1985

[54] OIL FILTER

[76] Inventor: Alfred Hebert, Skidmore Rd., Pleasant Valley, N.Y. 12569

[21] Appl. No.: 552,804

[22] Filed: Nov. 17, 1983

Related U.S. Application Data

[63] Continuation-in-part of Ser. No. 469,787, Feb. 25, 1983, which is a continuation of Ser. No. 274,395, Jun. 17, 1981, abandoned.

[51] Int. Cl.³ .................. B01D 27/06; B01D 35/06
[52] U.S. Cl. .................................. 210/209; 210/168; 210/223; 210/493.5
[58] Field of Search .................... 210/695, 198.1, 205, 210/206, 209, 222, 223, 168, 493.1, 493.5

[56] References Cited

U.S. PATENT DOCUMENTS

| | | | |
|---|---|---|---|
| 1,602,935 | 10/1926 | Rasey | 210/223 |
| 2,690,842 | 10/1954 | Spluvak | 210/222 |
| 2,760,637 | 8/1956 | Franch | 210/223 |
| 2,795,333 | 6/1957 | Kennedy | 210/223 |
| 2,893,561 | 7/1959 | Duzich | 210/223 |
| 2,983,384 | 5/1961 | Winslow | 210/223 |
| 3,072,260 | 1/1963 | Szwargulski | 210/223 |
| 3,279,607 | 10/1966 | Michaelson | 210/223 |
| 3,342,339 | 9/1967 | Riolo | 210/223 |
| 3,727,761 | 4/1973 | Aspinwall | 210/223 |
| 4,218,320 | 8/1980 | Liaw | 210/223 |

FOREIGN PATENT DOCUMENTS

| | | | |
|---|---|---|---|
| 54-42387 | 4/1979 | Japan | 210/695 |
| 675420 | 1/1952 | United Kingdom | 210/223 |

Primary Examiner—Ernest G. Therkorn
Attorney, Agent, or Firm—Martin J. Spellman, Jr.

[57] ABSTRACT

An automotive lubricating oil filter device comprising a main container body having inlets and outlets for the lubricating oil to be filtered, and a cylindrical filtering element through which the oil is filtered from the outer portion of the body inwardly to a central cylindrical core. The core contains a magnetized metallic helical structure within which is enclosed one or more longitudinal bars of magnesium metal.

The magnetized helical spring serves to remove fine metallic particles from the lubricating oil, preventing agglomeration on the filtering element, in addition to preventing engine wear, and the magnesium metal serves to neutralize sulfuric acid generated in the engine. The structure with the helical spring and bars contained therein may be removed and cleaned to be regenerated without requiring disposal of the main filter structure and vice versa.

2 Claims, 3 Drawing Figures

OIL FILTER

CROSS REFERENCE TO RELATED APPLICATIONS

This application is a continuation-in-part application of my co-pending application, Ser. No. 469,787, filed Feb. 25, 1983, which, in turn, is a streamline continuation application of co-pending application Ser. No. 274,395, filed June 17, 1981, now abandoned.

BACKGROUND OF THE INVENTION

1. Field of the Invention

The present invention relates to automotive lubrication oil filters.

It is well known that proper lubrication of automotive engines is perhaps the most critical routine step which can protect the engine from wear and greatly extend the useful life of the engine. Lubricating oil, besides performing its lubricating and cooling functions in the engine, serves to remove acids and other impurities as well as wear residues. They are conventionally removed by filtering elements through which the lubricating oil is continuously circulated and by replacing the lubricating oil with new oil at frequent intervals during the utilization of the engine.

Experience has shown that the filtering elements do not always effectively remove fine metallic particles from the oil medium and that dilution of acids by the volume of the lubricating oil is insufficient to prevent noticeable corrosion of the metal in the engine which accelerates wear. In addition, the fine metallic particles accelerate the clogging of the filtering elements by agglomerating thereon and if they are dislodged from the paper filter element in agglomerated form, they tend to cause more engine damage than if they are uniformly disbursed throughout the volume of oil.

Various attempts have been made to incorporate magnetized particles in the filtering element or to place sheets of magnetized metal within the filter elements. Such approaches complicate the manufacture of the filtering elements and add greatly to the expense of replacing the filter element.

Other attempts have been made to incorporate magnetic means within the oil filter system by utilizing annular blocks at the base of the filter which have limited surface areas for contact with the circulating oil.

2. Prior Art

A vehicle oil filter is disclosed in U.S. Pat. No. 2,890,257 Paton wherein a circular block with a central aperture is provided in the lower portion of the filter casing. The block is formed of a composite of magnetic material and a mass of magnesium metal as an insert. The object is to both collect the ferrous metallic particles and to attempt to neutralize the action of sulfuric acid in the oil. The location at the base of the filter element is such that the oil briefly contacts the inserts, but the limited surface area and restricted position makes the device less than satisfactorily effective in performing its functions.

U.S. Pat. No. 3,279,607 Michaelson shows an oil filter cartridge wherein bars of magnetized material and bars of magnesium are placed in the folds of a corrugated filtering element in an attempt to remove metallic particles and neutralize sulfuric acid as in the Paton reference. The incorporation of the bars or plates within the folds of the filter element limits their effectiveness, particularly if they are not inserted in all of the folds. To do so however, would obviously greatly increase the cost and complexity of the manufacturing of the filter elements which are generally of a disposable nature and of nominal cost.

A magnetized helical coil to remove metallic particles from the oil is located externally of the filtering elements in U.S. Pat. No. 3,727,761 Aspinwall et al. in a complicated hydraulic filter structure.

Also of interest in U.S. Pat. No. 2,893,561 Duzich which discloses various sheet paper or batts of fibrous filter elements in which magnetized particles are diffusely located in order to attract metallic particles from the oil being filtered.

In U.S. Pat. No. 4,218,320 Liaw, an oil filter is disclosed in which an attached accessory wrap of either an electro-magnet or permanent magnet is wound around the main body of the filter in order to attract fine iron particles to it to prevent them from penetrating the rolled filter element. This device serves to lengthen the duration of the usefulness of the filter paper. It is wound externally of the outer side of the filter can body and does not come in contact with the lubricating oil.

U.S. Pat. No. 3,342,339 Riolo discloses a conventional casing structure with permanent magnets fixedly incorporated into the filter structure.

U.S. Pat. No. 2,795,333 Kennedy relates to a fuel filter and discloses a spring used to retain a treating element.

SUMMARY OF THE INVENTION

The present discovery concerns an automotive lubricating oil filter device capable of removing fine metallic particles from the circulating oil and neutralizing sulfuric and other acids which may be circulating in the volume of oil in the engine.

The improved oil filter device of this invention comprises an outer container member in cylindrical form, closed at the other end thereof. The container is provided with inlet and outlet means at the inner end thereof which end is attached to the engine block in a conventional manner. Oil from the engine flows from the region of the internal walls of the outer container through a filtering unit which is comprised of multiple wrapped layers, fibrous batt, or accordian pleated sheets as is well known. The oil flows towards the cylindrical central core and from there returns to the engine through a central outlet.

In the filter device of the present invention, within the cylindrical central core of the filter inward of the filtering element, there is located a permanently magnetized metal helix structure and within the central portion of the helical enclosure, one or more metallic bars containing sufficient magnesium metal to neutralize sulfuric acid carried by the volume of oil passing by the helix.

As the oil comes in contact with the magnesium metal, the acid present is neutralized forming a harmless salt with the magnesium, therefore eliminating the corrosive effect of the sulfuric acid on the metal parts of the engine. The fine metallic particles carried in the oil are removed by being attracted to the magnetic helices which, for their weight and size, have a very large surface area.

By means of the present invention, the metallic fines are positively removed from the oil and not permitted to flake off or agglomerate as in the case of being retained on the filtering element. The magnesium metal bars are retained within the helix so that both the magnesium bars and the magnetized helix can be removed in one step for cleaning and reuse or replacement as a single element.

Preferably the inner terminus of the helical magnetic structure extends into the central outlet thereby contacting oil just as it is about to return to engine block.

The magnesium metal and the magnetized helix are relatively permanent. The metal particles can be removed from the helix by being attracted to a stronger magnet or by being physically removed with a wiping cloth, and, at the same time, the magnesium complex, which will accumulate on the magnesium metal, can be mechanically cleaned off when the filtering element is changed.

In an alternative embodiment of the invention, the helix may be comprised of magnesium metal and the bars enclosed within the helix may be comprised of magnetic material. In this case a single bar magnet would generally suffice.

With the present invention therefore, the efficiency of the oil filter is greatly improved. Engine acids in the oil are neutralized, the metal fines affirmatively removed and the conventional filtering elements' useful life extended. Since the magnetic means and magnesium are not incorporated in the filtering element, they are not lost when the filter is changed and the filtering element remains a relatively inexpensive disposable item.

Engine life is extended significantly by utilization of the filter means of the present invention.

ILLUSTRATIVE SPECIFIC EMBODIMENT

Figure 1:
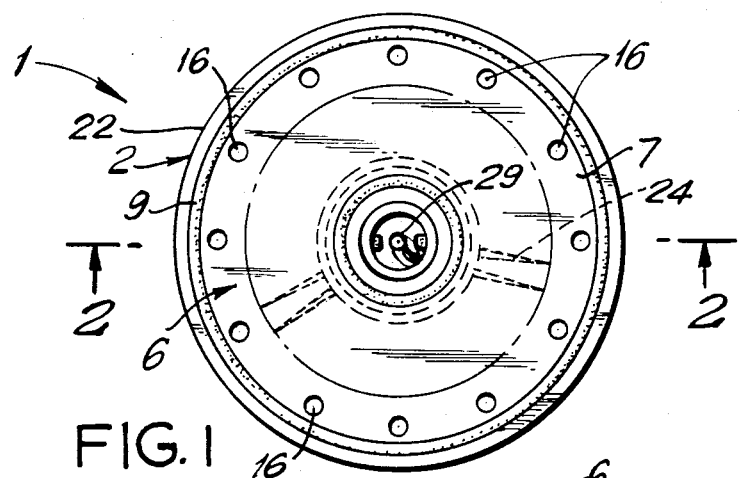
FIG. 1 is a top view of filter according to the present invention.

Referring to the accompanying drawing, there is shown a representative illustrative embodiment of the oil filter device according the the invention of this application. It should be understood that this embodiment is merely illustrative and many modifications in the structure of the filter device can be made within the scope of the present invention.

In the drawings, the device 1 is shown with an outer cylindrical container portion 2 of the usual can-like body shape.

Figure 2:
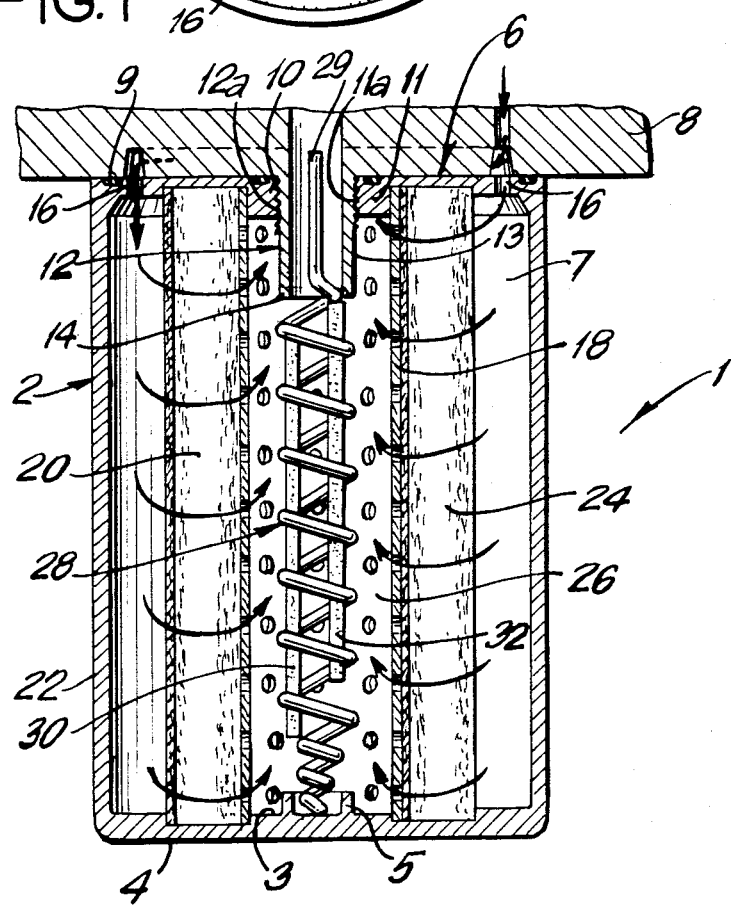
FIG. 2 is a sectional view of the filter of FIG. 1 taken along lines 2—2.
Figure 3:
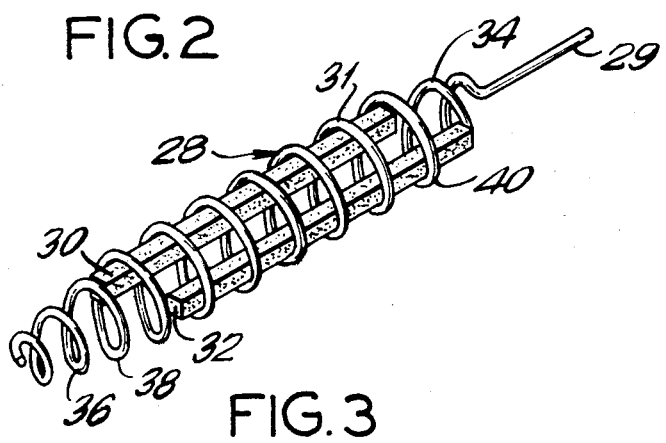
FIG. 3 is an enlarged view showing the magnetized helix and magnesium bars utilized in the filter of the present invention.

The outer end 4 is closed and is provided with an annular pedestal 5 on the central interior surface 3 thereof as shown in FIG. 2 to hold the helical structure 28 in place along the longitudinal axis of the device 1.

The opposite inner end 6 which attaches to the engine block 8 has a central outlet 10 of conventional known construction.

The outlet 10 is in the form of central annular opening with the walls 11 thereof internally threaded 11a to match the threads 12a on the standard exteriorly threaded conduit 12 extending from the engine block 8. Annular sealing gaskets 9 of the conventional form are provided to seal the device 1 against the block 8.

The outer region 7 at the end 6 has apertures 16 as inlets for oil coming from the engine block 8. A centrally located perforated shell 18 defines the filtering region 20 between the walls 22 of the container 2 of the device 1 in which a conventional accordian-shaped filter element 24 is located. The heavy arrows illustrate the general flow pattern of oil coming from the engine block 8 passing through the filter element 24 to a central core region 26. In the core region 26 is located the magnetized metal helical structure 28 which retains bars 30 and 32 of magnesium metal within its windings.

The helix 28 is a permanent magnet having relatively high surface area for scavenging the metallic wear particles from the oil. The end portions 34 and 36 of the helix are formed with windings 38 and 40 spaced so as to retain within the helix two magnesium metal bars 30 and 32. The terminus 29 of the helical structure 28 at end 34 is formed to extend into the outlet 10 as shown to assure contact with the oil as it leaves the device 1 and enters the engine block.

The helix 28 is dimensioned so that the radius of the central windings 31 is less than that of the interior surface of walls 11 of the opening outlet 10, but greater than that of the walls 13 of the conduit 12. The annular end 14 of the annular conduit walls 13 thus serves to hold the helix within the devise when mounted on the engine block 8.

As shown, the terminus 29 is so formed as to extend into the outlet 10 within the conduit so that it contacts the oil as it enters the engine block 8.

The magnesium metal reacts with sulfuric acid which may be contained in the lubricating oil to form magnesium sulfate to neutralize the acids in the oil. The helix structure 28 and bars 30 and 32 may be removed from the device 1 when the filter is changed, or at more frequent intervals. The metallic wear particles that have been collected on the helix physically are then removed, and the magnesium sulfate removed from the bars 30 and 32. The helix 28 and bars 30 and 32 may then be inserted in the same or a replacement filter and used over and over.

Although the invention has been described by reference to an illustrative embodiment, it is not intended that the novel device be limited thereby, but that modifications thereof are intended to be included as falling within the broad spirit and scope of the foregoing disclosure, the following claims and the appended drawings.

What is claimed:

1. An oil filter device comprising an outer cylindrical container member having inner and outer ends, the outer end of said member being closed, said inner end having a central annular outlet aperture with internally threaded walls adapted to engage exteriorly threaded walls of an annular conduit extending from an engine block, the outer regions of said inner end having inlet apertures formed therein, a cylindrical perforated shell centrally located within said outer member and defining a filtering regions between the cylindrical walls of the outer container and said shell, an accordian-shaped filter element located in said filtering region, and within the perforated shell a core region, said core region adapted to contain a permanently magnetized metal helical structure within which structure is retained at least one bar of magnesium metal, the inner terminus of said helical structure extending into said central outlet aperture, central windings of said helical structure having a radius less than the radius of said central outlet aperture and greater than the radius of the said annular conduit, whereby oil flowing inwardly through said filtering element flows past said helical structure and magnesium bar, and metallic particles in said oil are removed by said magnetized helix, and acid carried by said oil is neutralized by said magnesium metal, and said oil flows out of said oil filter device through said central outlet aperture.

2. An oil filter device comprising an outer cylindrical container member having inner and outer ends, the outer end of said member being closed, said inner end having a central annular outlet aperture with internally threaded walls adapted to engage exteriorly threaded walls of an annular conduit extending from an engine block, the outer regions of said inner end having inlet apertures formed therein, a cylindrical perforated shell centrally located within said outer member and defining a filtering region between the cylindrical walls of the outer container and said shell, an accordian-shaped filter element located in said filtering region, and within the perforated shell a core region, said core region adapted to contain a magnesium metal helical structure within which structure is retained at least one bar of magnetic metal, the inner terminus of said helical structure extending into said central outlet aperture, central windings of said helical structure having a radius less than the radius of said central outlet aperture and greater than the radius of the said annular conduit, whereby oil flowing inwardly through said filtering element flows past said helical structure and magnetic bar, and metallic particles in said oil are removed by said magnetic bar, and acid carried by said oil is neutralized by said magnesium metal, and said oil flows out of said oil filter device through said central outlet aperture.

* * * * *